(12) United States Patent
Ishida

(10) Patent No.: US 11,562,296 B2
(45) Date of Patent: Jan. 24, 2023

(54) MACHINE LEARNING DEVICE, MACHINE LEARNING METHOD, AND STORAGE MEDIUM

(71) Applicant: FUJITSU LIMITED, Kawasaki (JP)

(72) Inventor: Tsutomu Ishida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 363 days.

(21) Appl. No.: 16/845,496

(22) Filed: Apr. 10, 2020

(65) Prior Publication Data

US 2020/0334574 A1 Oct. 22, 2020

(30) Foreign Application Priority Data

Apr. 16, 2019 (JP) .............................. JP2019-077839

(51) Int. Cl.
| | |
|---|---|
| *G06N 20/00* | (2019.01) |
| *H04L 43/04* | (2022.01) |
| *H04L 43/06* | (2022.01) |
| *H04L 12/28* | (2006.01) |
| *F24F 11/58* | (2018.01) |
| *H05B 47/00* | (2020.01) |

(52) U.S. Cl.
CPC ............ *G06N 20/00* (2019.01); *H04L 43/04* (2013.01); *H04L 43/06* (2013.01); *F24F 11/58* (2018.01); *H04L 12/2823* (2013.01); *H05B 47/00* (2020.01)

(58) Field of Classification Search
None
See application file for complete search history.

(56) References Cited

U.S. PATENT DOCUMENTS

| | | | |
|---|---|---|---|
| 11,063,881 B1* | 7/2021 | Vijayasuganthan | .. H04L 47/748 |
| 2016/0054021 A1* | 2/2016 | Lee | ......... F24F 11/523 |
| | | | 700/276 |
| 2016/0246268 A1* | 8/2016 | EIBsat | ..................... G06F 17/16 |
| 2017/0115675 A1* | 4/2017 | Demetriou | ......... G05D 23/1902 |
| 2018/0046164 A1 | 2/2018 | Drees | |
| 2018/0053102 A1 | 2/2018 | Martinson et al. | |
| 2018/0195752 A1* | 7/2018 | Sasaki | ...................... F24F 11/80 |
| 2019/0283773 A1 | 9/2019 | Mori et al. | |

(Continued)

FOREIGN PATENT DOCUMENTS

| | | |
|---|---|---|
| JP | 2018-026129 A | 2/2018 |
| JP | 2018-027776 A | 2/2018 |
| WO | 2018/016248 A1 | 1/2018 |

*Primary Examiner* — Lashonda Jacobs-Burton
(74) *Attorney, Agent, or Firm* — Fujitsu Patent Center

(57) ABSTRACT

A machine learning method executed by a computer, the method includes distributing a first learning model learned on the basis of a plurality of logs collected from a plurality of electronic devices to each of the plurality of electronic devices, the first learning model outputting operation content for operating an electronic device; when an operation different from an output result of the first learning model is performed by a user relative to a first electronic device among the plurality of electronic devices, estimating a similar log corresponding to a state of the learning model in which the different operation is performed from the plurality of logs; generating a second learning model on the basis of a log obtained by excluding a log of a second electronic device associated with the similar log from among the plurality of logs; and distributing the second learning model to the first electronic device.

11 Claims, 16 Drawing Sheets

(56) References Cited

U.S. PATENT DOCUMENTS

| | | | |
|---|---|---|---|
| 2019/0369575 A1* | 12/2019 | Raina | F24F 11/56 |
| 2020/0379454 A1* | 12/2020 | Trinh | G06N 3/088 |
| 2021/0125099 A1* | 4/2021 | Taguchi | G06F 16/254 |
| 2021/0254851 A1* | 8/2021 | Taguchi | G05B 13/027 |
| 2022/0018567 A1* | 1/2022 | Ock | F24F 11/63 |
| 2022/0019935 A1* | 1/2022 | Ghatage | G06N 20/00 |
| 2022/0092062 A1* | 3/2022 | Ferrar | G06F 40/16 |
| 2022/0154960 A1* | 5/2022 | Hokari | F24F 11/62 |
| 2022/0164437 A1* | 5/2022 | Crouch | G06F 21/55 |

* cited by examiner

FIG. 3

| AIR CONDITIONER ID | DATE AND TIME | ROOM TEMPERATURE | OUTSIDE TEMPERATURE | ... |
|---|---|---|---|---|
| a001 | 11/1/2019 0:00 | 20 | 10 | ... |
| | 11/1/2019 1:00 | 19 | 10 | ... |
| | ... | ... | ... | ... |
| a002 | 11/1/2019 0:00 | 25 | 20 | ... |
| | ... | ... | ... | ... |
| ... | ... | ... | ... | ... |

FIG. 4

| AIR CONDITIONER | TIME | OPERATION | AI Flag |
|---|---|---|---|
| a001 | 11/1/2019 0:00 | Keep | - |
| | 11/1/2019 1:00 | Down | 1 |
| | ... | ... | ... |
| a002 | 11/1/2019 0:00 | Down | 0 |
| | ... | ... | ... |
| ... | ... | ... | ... |

MACHINE LEARNING DEVICE, MACHINE LEARNING METHOD, AND STORAGE MEDIUM

CROSS-REFERENCE TO RELATED APPLICATION

This application is based upon and claims the benefit of priority of the prior Japanese Patent Application No. 2019-77839, filed on Apr. 16, 2019, the entire contents of which are incorporated herein by reference.

FIELD

The embodiments discussed herein are related to a learning device, a learning method, and a storage medium.

BACKGROUND

A cooperation system is used in which a cloud that performs air conditioning for controlling an air conditioner and the like and an edge cooperate with each other so as to make a room temperature comfortable for a user. For example, a cloud server acquires a sensor value such as a room temperature and an outside temperature and an operation log of an air conditioner from each edge that is an air conditioner in each room or the like. Then, the cloud server learns a machine learning model by using the sensor value and the operation log and distributes the machine learning model to each edge. Each edge estimates a user's operation by using the learned machine learning model and changes temperature setting of the air conditioner before the user's operation is performed so as to perform air conditioning control comfortable for the user.

In recent years, a technology has been known in which a cloud server extracts similar edges and generates a group by using the information collected from each edge and generates a machine learning model for each group by using the data collected by the edge belonging to each group. Furthermore, a technology has been known that performs relearning so that data that has not adapted is adapted when the distributed machine learning model does not adapt to the edge. For example, International Publication Pamphlet No. WO 2018/16248, Japanese Laid-open Patent Publication No. 2018-26129, Japanese Laid-open Patent Publication No. 2018-27776, and the like are disclosed as related art.

SUMMARY

According to an aspect of the embodiments, a machine learning method executed by a computer, the machine learning method includes distributing a first machine learning model learned on the basis of a plurality of logs collected from a plurality of electronic devices to each of the plurality of electronic devices, the first machine learning model outputting operation content for operating an electronic device; when an operation different from an output result of the first machine learning model is performed by a user relative to a first electronic device among the plurality of electronic devices, estimating a similar log corresponding to a state of the machine learning model in which the different operation is performed from the plurality of logs; generating a second machine learning model on the basis of a log obtained by excluding a log of a second electronic device associated with the similar log from among the plurality of logs; and distributing the second machine learning model to the first electronic device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a sensor value DB;

FIG. 4 is a diagram illustrating an example of information stored in an operation log DB;

DESCRIPTION OF EMBODIMENTS

However, an efficiency of relearning is low, it takes time to generate a machine learning model having accuracy suitable for each edge, and time when the user feels uncomfortable increases.

Typically, it is difficult to acquire all feature amounts that express an edge, and a machine learning model is learned by using a part of the feature amounts. Therefore, there is a case where a model that is not suitable for an edge is generated although models are similar to each other by definition. For example, even if 10 air conditioners have similar setting temperatures, outside temperatures, and humidity, heat insulating properties of built houses are different from each other depending on a material such as wood, light-gauge steel, reinforced concrete, or the like. However, since the above information is not acquired as the feature amount, even if a machine learning model is generated according to data collected from the ten air conditioners described above, an adaptive edge and unadaptive edge are generated.

Furthermore, when a deduction result with respect to certain data is not appropriate regarding the distributed machine learning model, even if relearning is performed by using the data, when different data is generated, a situation occurs in which a deduction result is not appropriate. Therefore, relearning is frequently repeated. In this case, it takes time to improve accuracy of the machine learning model, and the time when the user feels uncomfortable increases. In consideration of the above, it is desirable to efficiently learn a machine learning model adapted to each edge.

Hereinafter, embodiments of a learning method, a learning program, and a learning device disclosed in the present application will be described in detail with reference to the drawings. Note that the present embodiment is not limited by these embodiment. Furthermore, the embodiments can be appropriately combined within a range without contradiction.

First Embodiment

Example of Overall Configuration

Figure 1:
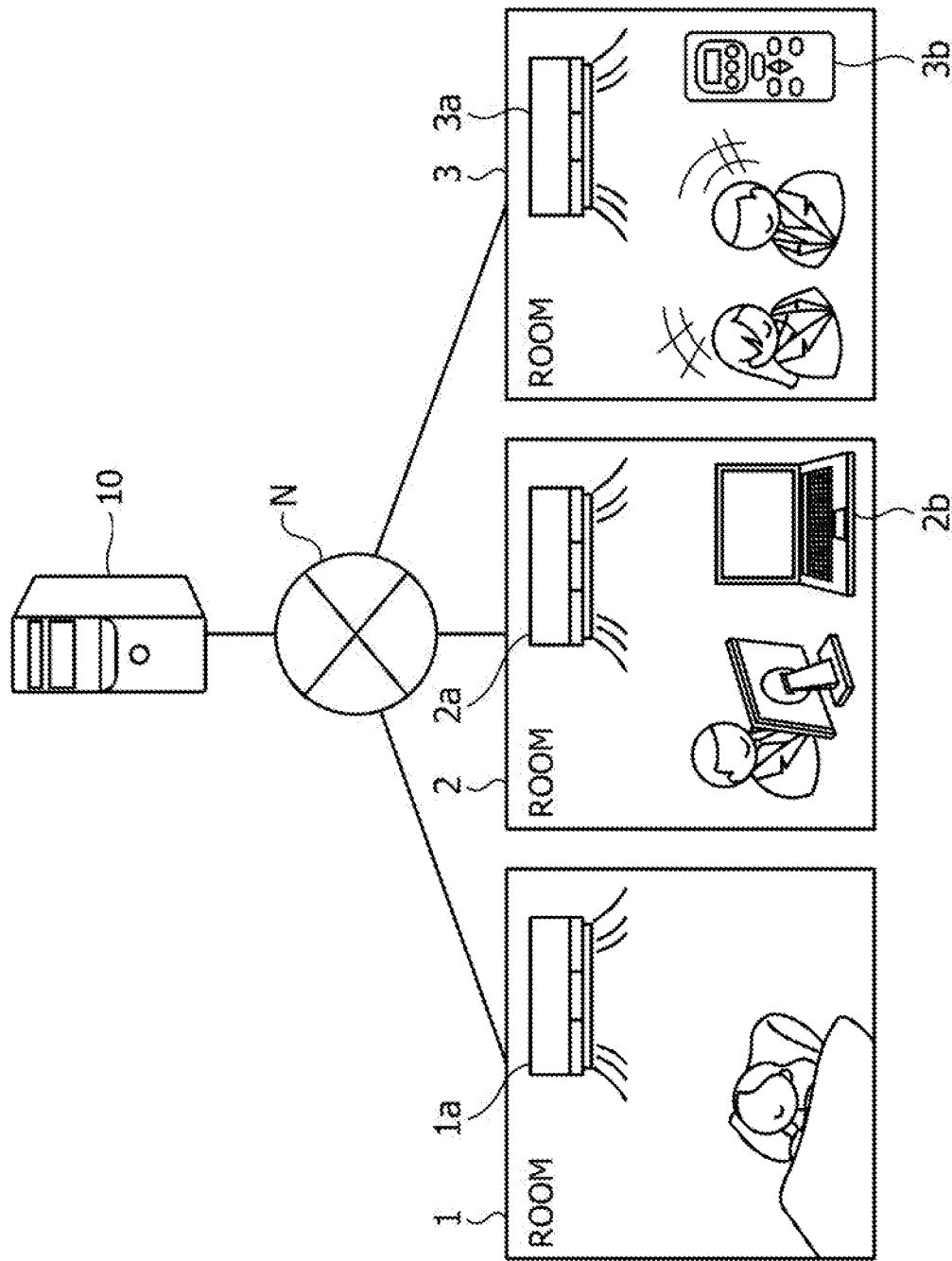
FIG. 1 is a diagram illustrating an example of an overall configuration of a system according to a first embodiment.

FIG. 1 is a diagram illustrating an example of an overall configuration of a system according to a first embodiment. As illustrated in FIG. 1, the system is an air conditioning control system in which a cloud server cooperates with an edge. In this system, a cloud server 10 is communicably connected to a communication device in each room corresponding to an edge via a network N. Note that, as the network N, various communication networks such as the Internet or the like can be adopted regardless of wired or wireless communication.

Each room is an example of the edge which is a control target by the cloud server 10. For example, a room 1 includes an air conditioner 1a that is provided in the room and controls air conditioning in the room. A room 2 includes an air conditioner 2a that is provided in the room and controls air conditioning in the room and an information terminal 2b that transmits an air conditioning control instruction to the air conditioner 2a by using a wireless network, a Universal Plug and Play (UPnP), or the like. Furthermore, a room 3 includes an air conditioner 3a that is provided in the room and controls air conditioning in the room and a remote controller 3b that transmits an air conditioning control instruction to the air conditioner 3a.

Note that, here, the description will be made as assuming, in each room, a device that receives a machine learning model distributed from the cloud server 10, predicts a user's operation by using the machine learning model, and controls air conditioning depending on the prediction result as an edge terminal. For example, in a case of the room 1, the air conditioner 1a corresponds to the edge terminal, in a case of the room 2, the information terminal 2b corresponds to the edge terminal, and in a case of the room 3, the remote controller 3b corresponds to the edge terminal.

Furthermore, although not illustrated, in each room, a sensor that measures an outside temperature, a sensor that measures a temperature and humidity in the room, or the like are provided. Furthermore, sensor values sensed by various sensors (may be described as observed value or log) are transmitted to the cloud server 10 by the respective sensors or the like. Furthermore, each air conditioner and each edge terminal collect an operation log or the like in which on/off of the air conditioning control is associated with a time and transmits the collected operation log or the like to the cloud server 10. Note that, here, a case where there are three room is illustrated. However, this is merely an example and does not limit the number of rooms or the like.

The cloud server 10 is a server device that provides a cloud service to a user in each room corresponding to the edge and receives the sensor value, the operation log, or the like from each room and learns a machine learning model by using the sensor value and the operation log as training data. For example, the cloud server 10 learns a machine learning model (classification model) used for class classification as using temperature information such as a room temperature, an outside temperature, or the like as an explanatory variable and using a user's operation indicating to increase the temperature (Up), to lower the temperature (Down), to maintain the temperature (Keep), or the like as an objective variable. Then, the cloud server 10 distributes the learned machine learning model to each edge terminal.

Then, each edge terminal in each room predicts a user's operation from current temperature information of each room by using the machine learning model distributed from the cloud server 10 and controls the air conditioning depending on the prediction result. In this way, the air conditioning control on the edge side is realized.

By the way, in such a cloud-edge cooperation system, it is preferable to generate a machine learning model for each edge by using a log such as the sensor value of each edge. However, only the data collected from the edge alone is often not enough for the training data. Therefore, the machine learning model is learned by using data acquired from a plurality of, for example, 100 edges as the training data.

Since such a machine learning model is learned by using the data of the plurality of edges, the machine learning model is learned in a state where air conditioning control environments of the edges are mixed. Therefore, training data that is suitable for each edge and training data that is not suitable for each edge are included. For example, it is not preferable to use data of an edge B having low heat insulating properties for an edge A having high heat insulating properties as training data. However, it is different for the cloud service that has many restrictions on collecting personal information to group edges having similar air conditioning control environments and extracting edges having different air conditioning control.

Therefore, for example, the cloud server 10 according to the first embodiment uses data collected from the plurality of edges A to Z as the training data and distributes a machine learning model generated by using the training data to each edge. Then, for example, when a deduction result (prediction result) deducted (predicted) by the edge A is not appropriate for the edge A, the cloud server 10 specifies data associated with the deduction result and excludes data of the edge B that is a source of the data from the training data. Then, the cloud server 10 relearns the machine learning model for the edge A by using the training data from which the data of the edge B is deleted and distributes the relearned machine learning model to the edge A. In this way, the cloud server 10 can efficiently learn the machine learning model adapted to each edge.

[Functional Configuration]

Figure 2:
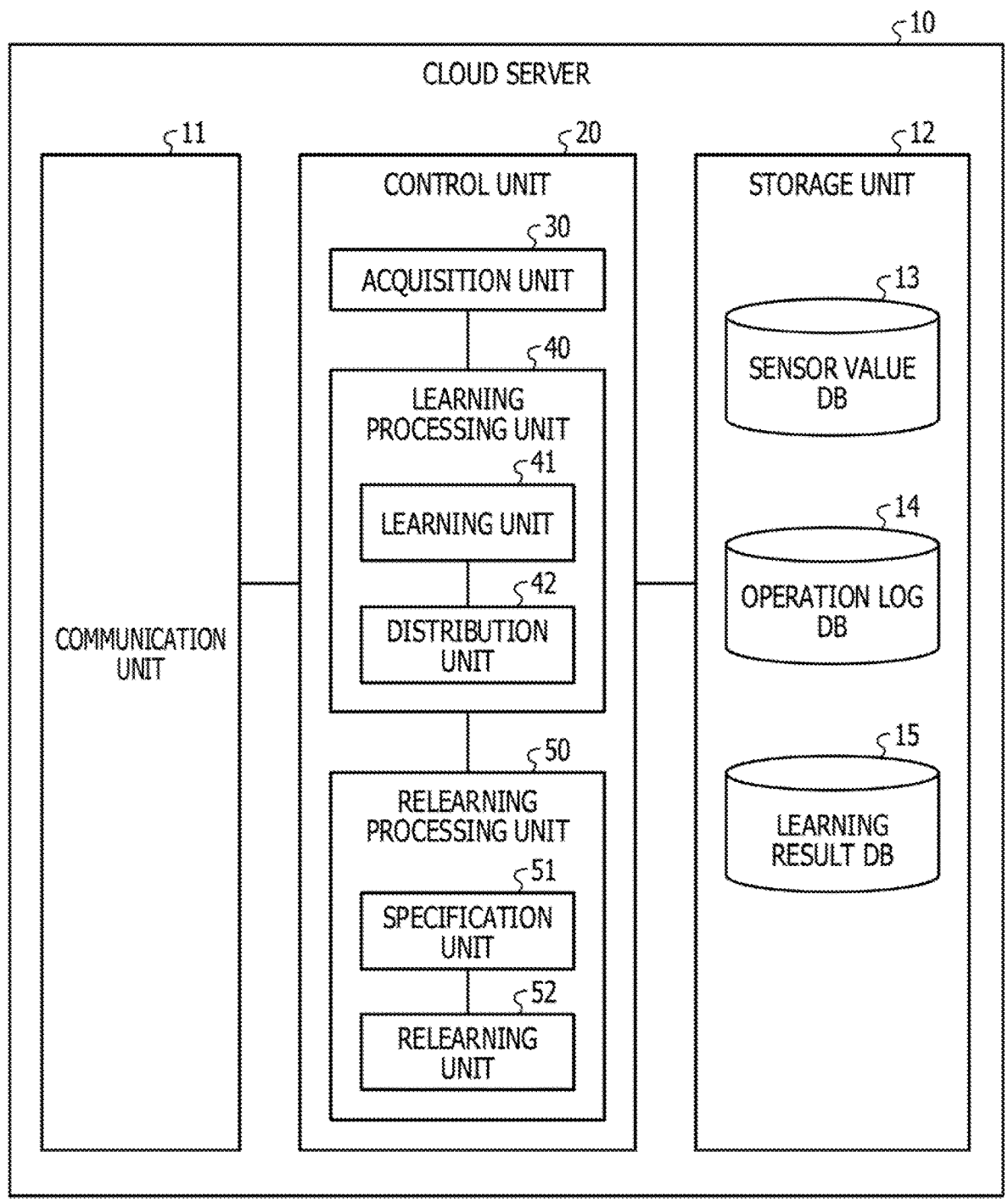
FIG. 2 is a functional block diagram illustrating a functional configuration of a cloud server according to the first embodiment.

Next, a functional configuration of the cloud server 10 illustrated in FIG. 1 will be described. FIG. 2 is a functional block diagram illustrating the functional configuration of the cloud server 10 according to the first embodiment. As illustrated in FIG. 2, the cloud server 10 includes a communication unit 11, a storage unit 12, and a control unit 20.

The communication unit 11 is a processing unit that controls communication with other device and is, for example, a communication interface or the like. For example, the communication unit 11 receives various data such as operation results, air conditioning control information, operation logs, or the like from a device such as an air conditioner, an edge terminal, a sensor, or the like provided in each room and transmits a machine learning model to the edge terminal.

The storage unit 12 is an example of a storage device that stores data and a program executed by the control unit 20 and is, for example, a memory, a hard disk, or the like. The storage unit 12 stores a sensor value DB 13, an operation log DB 14, and a learning result DB 15.

The sensor value DB 13 is a database that stores sensor values regarding an outside temperature, a room temperature, a humidity in the room, and the like acquired by the sensor in each room. For example, the sensor value stored here is an observed value that is acquired by the cloud server 10 from each sensor and may include another observed value that can be measured by the sensor, such as a temporal change in the temperature. Furthermore, the sensor value DB 13 stores a sensor value for each user, for example, for each sensor in each room (space).

FIG. 3 is a diagram illustrating an example of information stored in the sensor value DB 13. As illustrated in FIG. 3, the sensor value DB 13 stores "an air conditioner, a date and time, a room temperature, and an outside temperature" or the like in association with each other. The "air conditioner" stored here is an identifier used to identify the air conditioner, and the "date and time" is a date and time when the data is measured. The "room temperature" is a temperature in a room measured by each sensor in each room, and the "outside temperature" is an outside temperature measured by each sensor in each room. In the example in FIG. 3, the sensor values for one hour are illustrated. Regarding an air conditioner (a001), it is indicated that "the room temperature is 20 degrees and the outside temperature is 10 degrees at 0:00 on Nov. 1, 2019".

The operation log DB 14 is a database that stores log information regarding an operation of the air conditioner in each room. The log information stored here is information acquired by the cloud server 10 from each air conditioner, a remote controller of each air conditioner, or the like and may include other information that can be measured by the air conditioner or the like, such as a setting temperature or the like. Furthermore, the operation log DB 14 stores an operation log for each user, for example, for each air conditioner in each space.

FIG. 4 is a diagram illustrating an example of information stored in the operation log DB 14. As illustrated in FIG. 4, the operation log DB 14 stores "an air conditioner, a date and time, an operation, and an AI-Flag" in association with each other. The "air conditioner" stored here is an identifier used to identify the air conditioner, and the "date and time" is a date and time of the measurement. The "operation" is an operation log of each air conditioner. The "AI-Flag" is information indicating whether or not the prediction is made by using the machine learning model and information generated by the edge terminal. When an operation is performed according to the prediction of the machine learning model, "1" is set, and when a change is made by a user's operation, "0" is set.

In the example in FIG. 4, it is indicated that the setting temperature of the air conditioner (a001) does not change (Keep) at 0:00 on Nov. 1, 2019. Furthermore, it is indicated that the setting temperature of the air conditioner (a001) is lowered (Down) according to the prediction of the machine learning model at 1:00 on Nov. 1, 2019. Furthermore, it is indicated that a setting temperature of an air conditioner (a002) is lowered (Down) by a user's operation at 0:00 on Nov. 1, 2019.

The learning result DB 15 is a database that stores a learning result. For example, the learning result DB 15 stores a determination result (classification result) of the training data by the control unit 20 and various parameters and the like used to construct a machine learning model using a neural network, a logistic regression, or the like.

Note that, in addition to these DBs, various information can be stored. For example, a weather information DB can be stored that stores weather information acquired from an external weather server, which is not illustrated, or the like. For example, the weather information DB stores observed values of an outside temperature and humidity, forecast values of the outside temperature and the humidity, the weather, or the like acquired by the cloud server 100 from the weather server at an arbitrary timing.

The control unit 20 is a processing unit that controls the entire cloud server 10 and is, for example, a processor or the like. The control unit 20 includes an acquisition unit 30, a learning processing unit 40, and a relearning processing unit 50. Note that the acquisition unit 30, the learning processing unit 40, and the relearning processing unit 50 are examples of an electronic circuit included in a processor and examples of a process performed by the processor.

The acquisition unit 30 is a processing unit that collects various observed values from each sensor or the like in each room. For example, the acquisition unit 30 acquires the sensor value from each sensor and stores the sensor value in the sensor value DB 13, acquires the operation log from each air conditioner and stores the operation log in the operation log DB 14, and acquires the weather information or the like from the weather server or the like and stores the weather information in the storage unit 12 or the like. For example, the acquisition unit 30 collects various data to be the training data on the cloud. Note that the acquisition unit 30 periodically collects the sensor values or the like from each edge after the distribution of the machine learning model.

The learning processing unit 40 includes a learning unit 41 and a distribution unit 42 is a processing unit that generates training data by using the information such as the sensor value, the operation log, or the like collected by the acquisition unit 30, learns the machine learning model by using the training data, and distributes the learned machine learning model to each edge.

The learning unit 41 is a processing unit that generates the training data and generates the machine learning model. For example, the learning unit 41 generates the training data by using each piece of information such as the sensor value, the operation log, or the like collected by the acquisition unit 30 and stores the generated training data in the storage unit 12 or the like. Then, the learning unit 41 learns the machine learning model using the neural network, the logistic regression, or the like by using the training data. Then, when learning is completed, the learning unit 41 stores various parameters used to construct the machine learning model in the learning result DB 15 as the learning result.

For example, the learning unit 41 generates training data in which a user's operation at a certain time is set as an "objective variable" and a sensor value acquired five minutes before a certain time is set as an "explanatory variable". In more detail, the learning unit 41 generates "an air conditioner, time, a user's operation (label), and a feature amount" by using each piece of collected data. The "air conditioner" stored here is an identifier used to identify the air conditioner. The "time" is time when the user's operation is performed. The "user's operation" is operation content of air conditioning control by the user, and for example, to increase the setting temperature "Up", to lower the setting temperature "Down", to keep the setting temperature (do nothing) "Keep", or the like are set. In the "user's operation", a user's operation that is actually performed within a predetermined period of time (for example, 30 minutes) from the above "time" is set. The "feature amount" is a sensor value which is acquired five minutes before the time when the user's operation is performed or the like and is, for example, a combination of the room temperature, the humidity, and the outside temperature.

In this way, the learning unit 41 learns the machine learning model by using the training data in which a sensor value acquired five minutes before time t is set as the "explanatory variable" and a user's operation that is set as a user's operation at the time t and is performed within 30 minutes from the time t is set as the "objective variable". For example, the learning unit 41 generates the machine learning model that predicts the user's operation occurring at the time t which is five minutes later from the sensor value at five minutes before the time t.

As another example, the learning unit 41 can use not only the feature amount five minutes before but also a combination of "a feature amount five minutes before, a feature amount ten minutes before, and a feature amount 15 minutes before" as an explanatory variable. For example, the sensor value (feature amount) used as the explanatory variable can be arbitrarily selected. Furthermore, an example has been described in which the user's operation that is actually occurred within 30 minutes from the time t is set as the "user's operation at the time t" set as the objective variable. However, the setting can be arbitrarily changed to a user's operation at the time t, a user's operation within 10 minutes from the time t, or the like.

The distribution unit 42 is a processing unit that distributes the learned machine learning model to each edge terminal. For example, the distribution unit 42 reads various parameters used to construct the learned machine learning model from the learning result DB 15 and transmits the read parameter to each edge terminal. Each edge terminal can construct the learned machine learning model by using the distributed various parameters.

Figure 5:
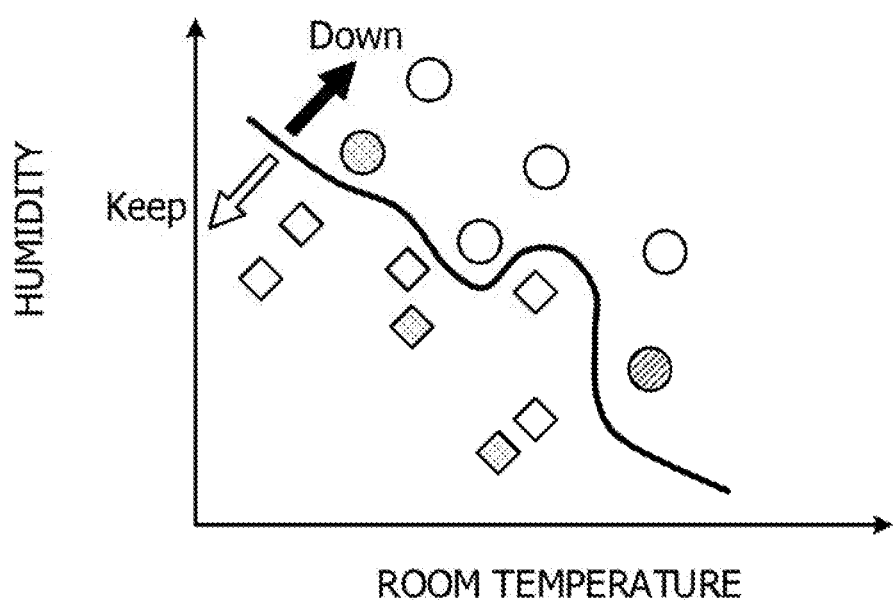
FIG. 5 is a diagram for explaining an image of a machine learning model.

FIG. 5 is a diagram for explaining an image of a machine learning model. Here, for easy description, an example will be described in which a user's operation is classified into two values, i.e. "Keep" and "Down" In a two-dimensional feature space of the room temperature and the humidity. Note that a thick line in FIG. 5 indicates a prediction boundary on the basis of the learned machine learning model.

As illustrated in FIG. 5, the machine learning model learned by the learning unit 41 predicts whether the user's operation that occurs within 30 minutes from the time t is "Keep" or "Down" on the basis of the room temperature and the humidity at the time t. Here, when "Keep" is predicted, it is predicted that an operation to increase the temperature or lower the temperature is not performed within 30 minutes from the time t, and the setting temperature is maintained. On the other hand, when "Down" is predicted, it is predicted that the operation to lower the temperature is performed within 30 minutes from the time t, and the setting temperature is lowered by a predetermined temperature (for example, one degree).

The relearning processing unit 50 includes a specification unit 51 and a relearning unit 52 and is a processing unit that relearns the machine learning model so that a machine learning model suitable for the edge terminal is obtained for each edge terminal. For example, the relearning processing unit 50 performs relearning while excluding the training data that is not suitable for the edge from the training data used by the learning processing unit 40 for each edge.

The specification unit 51 is a processing unit that specifies training data to be excluded from the learning target when the machine learning model is relearned on the basis of prediction accuracy according to the distributed machine learning model for each edge terminal. For example, the specification unit 51 performs (1) specification of a cancel operation, (2) specification of an operation log associated with the cancel operation, and (3) specification of data to be excluded from the learning target. Note that, here, an example will be described in which the edge A is relearned. However, similar processing is executed on other edges.

(1) Specification of Cancel Operation

The specification unit 51 acquires a prediction result by the distributed machine learning model and an actual user's operation from each edge terminal. Subsequently, the specification unit 51 specifies occurrence of a user's operation different from the prediction result, for example, occurrence of a cancel operation.

Figure 6:
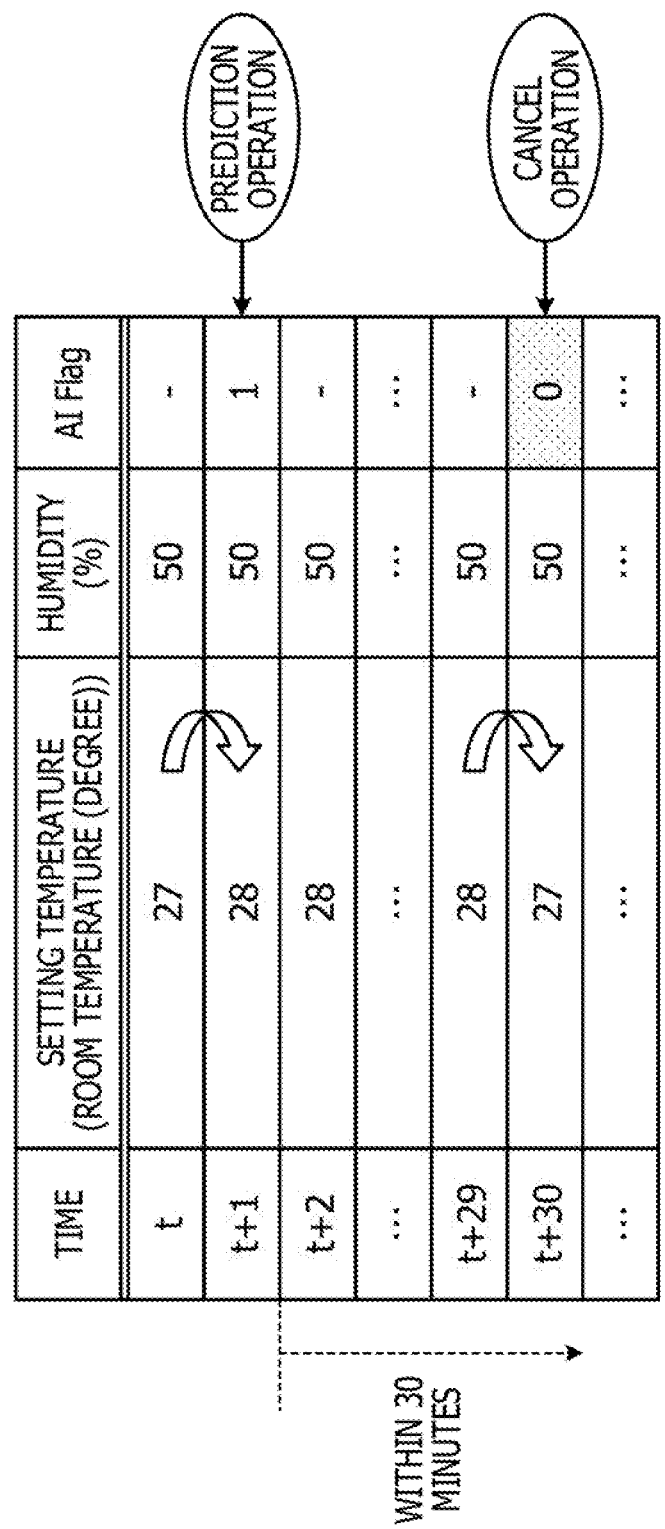
FIG. 6 is a diagram for explaining specification of a cancel operation.

FIG. 6 is a diagram for explaining the specification of the cancel operation. The specification unit 51 acquires the data illustrated in FIG. 6 collected by the edge terminal of the edge A after the distribution of the machine learning model from the edge terminal of the edge A. Here, the data illustrated in FIG. 6 is information indicating whether or not the prediction result associated with "the time, the setting temperature (room temperature), the humidity, and the AI-Flag" is correct. The "time" is time to be predicted, and the "setting temperature" is a temperature set by an air conditioner. The humidity is a humidity in a room measured by a sensor. The "AI-Flag" is information indicating whether or not the prediction is based on the machine learning model.

In a case of FIG. 6, the specification unit 51 specifies that the setting temperature is changed from "27 degrees" to "28 degrees" at a time t+1, and "1" is set to the "AI-Flag" at that time. Therefore, the specification unit 51 specifies that the setting temperature is changed according to the prediction by the machine learning model (prediction operation). Then, the specification unit 51 specifies that the setting temperature is changed from "28 degrees" to "27 degrees" at a time t+30 that is within 30 minutes from the time t+1. At this time, since "0" is set to the "AI-Flag", the specification unit 51 specifies that the setting temperature is changed by the user's operation instead of the prediction by the machine learning model. As a result, since the temperature setting by the prediction operation by the machine learning model performed at the time t+1 is canceled by the prediction operation by the user's operation at the time t+30 opposite to the prediction operation, the specification unit 51 specifies that the user's operation at the time t+30 as the "cancel operation".

For example, the specification unit 51 specifies that the cancel operation is performed on the prediction result (operation) that inputs the setting temperature "28 degrees" and the humidity "50%" after the distribution of the machine learning model by the edge A. Note that the number of cancel operations is not limited to one and may be plural.

(2) Specification of Operation Log Associated with Cancel Operation

After specifying the cancel operation, the specification unit 51 specifies an operation log (specification operation) associated with "the setting temperature (28 degrees) and the humidity (50%)" that is a target of the cancel operation from training data used for the machine learning model. For example, the specification unit 51 specifies training data in a state similar to the state of the edge A that performs the canceled operation. For example, the specification unit 51 specifies training data that adversely affects on the sensor values "the setting temperature (28 degrees) and the humidity (50%)" of the edge A. Note that, when the plurality of cancel operations is specified, the above processing is executed on each cancel operation.

Figure 7:
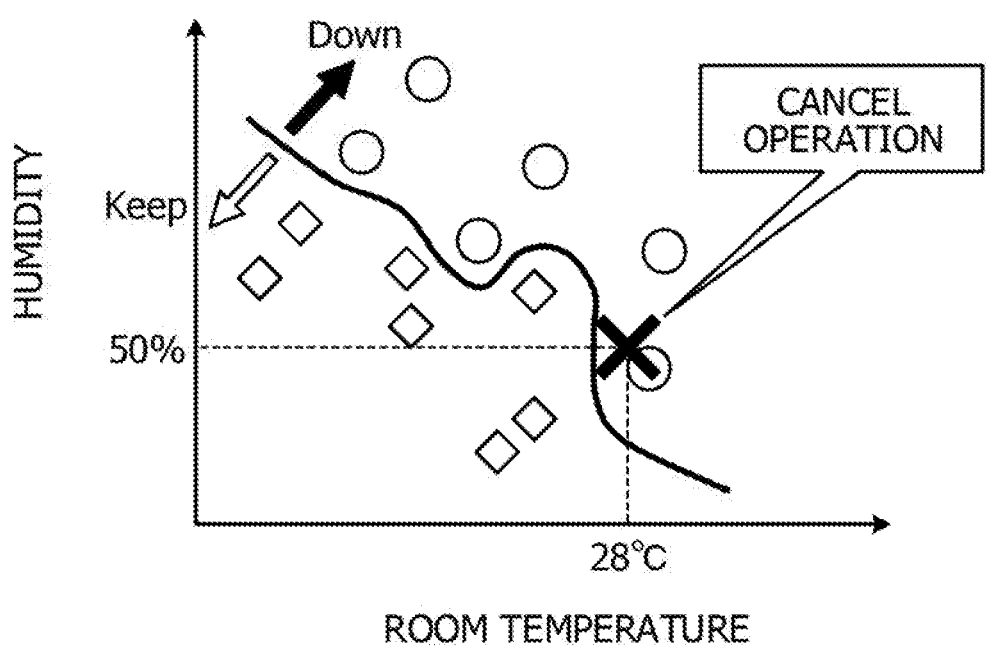
FIG. 7 is a diagram for explaining a method for specifying an operation log associated with the cancel operation.

FIG. 7 is a diagram for explaining a method for specifying an operation log associated with a cancel operation. In FIG. 7, an example will be described in which data (training data) in which an operation log and a sensor value are associated with a time and an air conditioner ID is plotted in a feature space that is a two-dimensional space of the room temperature and the humidity. Note that a thick line in FIG. 7 indicates a prediction boundary on the basis of the learned machine learning model.

As Illustrated in FIG. 7, the specification unit 51 plots the state in which the cancel operation (room temperature and humidity) is performed in the feature space and specifies an operation log closest to the state. For example, the canceled state is represented as a "vector t (corresponding to x in FIG. 7)", a set of operation logs of the user's operation "Down" to which the canceled state belongs is represented as $X_{down}$, and it is assumed that $X_{down}$ include an operation log "vector $x_i$" (i is natural number). In this case, the specification unit 51 specifies an operation log of which an absolute value of a difference between the "vector t" and the "vector $x_i$" is the smallest.

As another example, the specification unit 51 specifies an operation log of which a distance to the canceled operation in the feature space is less than a threshold. If the example above is explained, the specification unit 51 specifies an operation log of which an absolute value of "(vector t)–(vector $x_i$)" is less than a threshold c. Note that the threshold can be arbitrarily set and changed.

(3) Specification of Data Excluded from Learning Target

Figure 8:
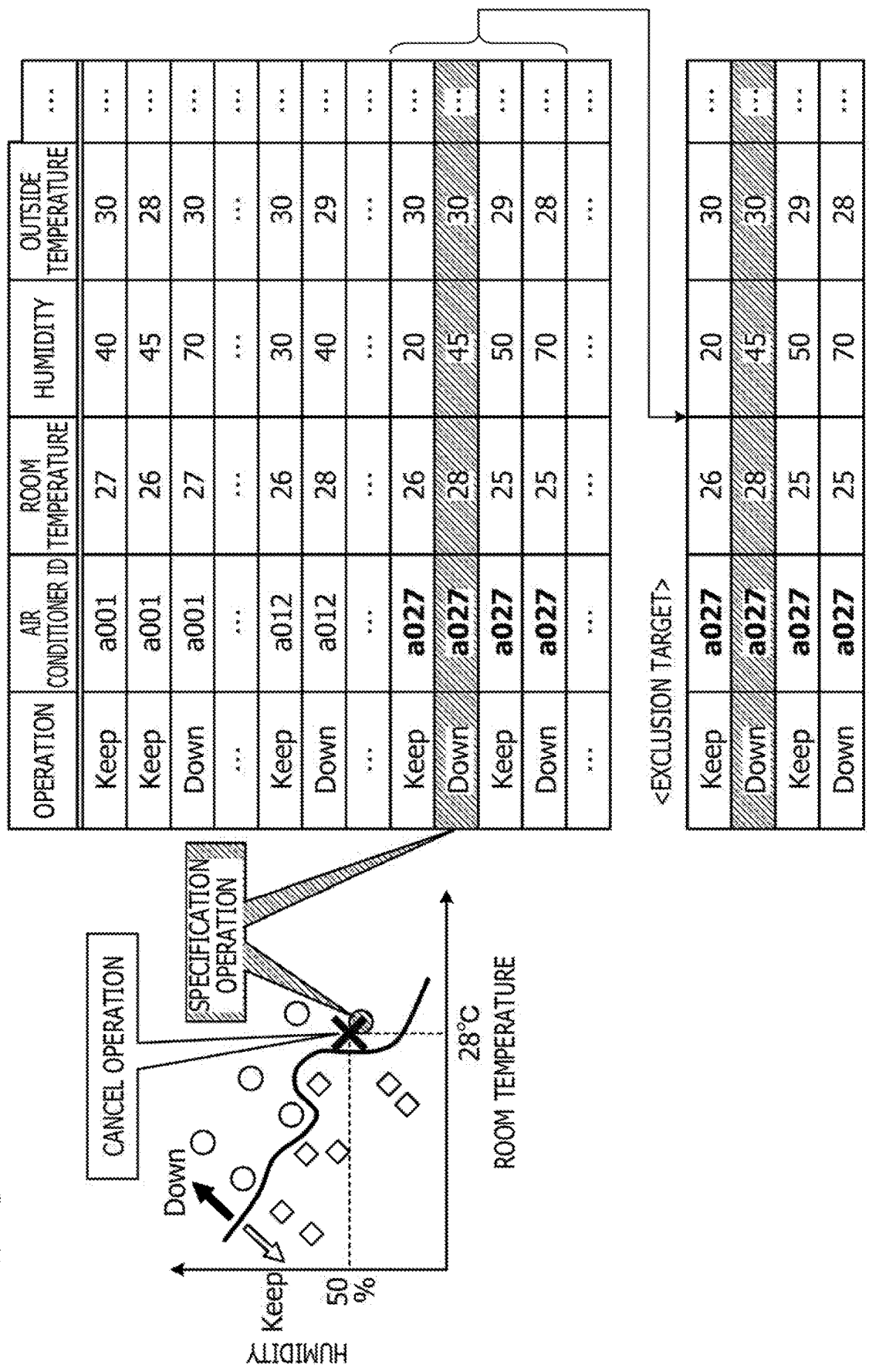
FIG. 8 is a diagram for explaining specification of data to be excluded from a learning target.

After specifying the operation log associated with the cancel operation, the specification unit 51 determines data of the edge corresponding to the operation log as data excluded from the learning target and notifies that of the relearning unit 52. FIG. 8 is a diagram for explaining specification of data to be excluded from the learning target. Here, an example will be described that includes the feature space illustrated in FIG. 7 and data (training data) obtained by integrating the information stored in the sensor value DB 13 and the information stored in the operation log DB 14.

As illustrated in FIG. 8, the specification unit 51 specifies a "specification operation" that is the operation associated with the cancel operation in the feature space. Subsequently, the specification unit 51 specifies data corresponding to the specification operation from among the training data with reference to various DBs. Here, it is assumed that the specification unit 51 specify data of "an operation (Down), an air conditioner ID (a027), a room temperature (28), a humidity (45), and an outside temperature (30) . . . ".

In this case, the specification unit 51 specifies that an edge corresponding to the air conditioner ID (a027) is not suitable as the training data of the edge A. As a result, the specification unit 51 determines a data group corresponding to the air conditioner ID (a027) among the training data used by the machine learning model as data excluded from the learning target and notifies the determined data of the relearning unit 52.

Returning to FIG. 2, the relearning unit 52 is a processing unit that relearns the machine learning model by using the training data from which the data notified by the specification unit 51 is excluded and distributes the relearned machine learning model to the edge.

Figure 9:
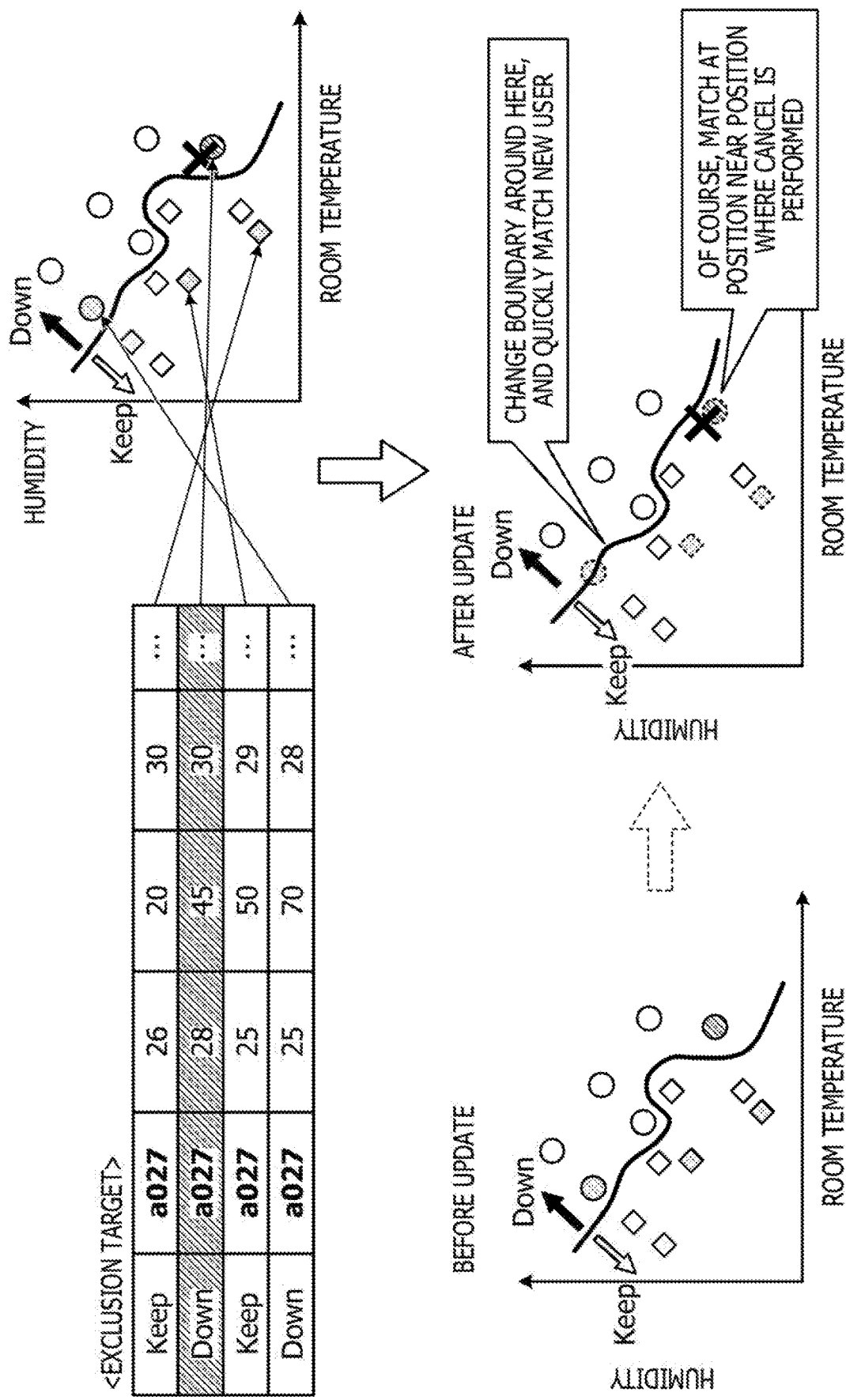
FIG. 9 is a diagram for explaining relearning.

An example of relearning for the edge A will be described with reference to FIG. 9. FIG. 9 is a diagram for explaining relearning. As illustrated in FIG. 9, the relearning unit 52 generates training data obtained by excluding the data associated with the air conditioner ID (a027) from the training data (operation log and sensor value) used at previous learning. For example, the data of the edge of the air conditioner ID (a027), which is estimated to have unfavorable effect on the machine learning model that is previously learned because an environment or the like is different from that of the edge A, is removed.

Then, the relearning unit 52 relearns the machine learning model by using the training data obtained by excluding the data that is not suitable as the training data for the edge A. Thereafter, the relearning unit 52 stores the relearning result in the learning result DB 15 and distributes the relearning result to the edge A. As a result, as illustrated in FIG. 9, relearning can be performed as excluding not only the data in which the cancel operation is performed but also related data related to the data. Therefore, it is possible to perform relearning on not only around the cancel operation in the feature space but also the entire feature space, and it is possible to totally update a boundary by the machine learning model.

Note that the relearning unit 52 can generate a relearned learned model by updating the learned machine learning model by performing the relearning by using the excluded training data on the learned machine learning model. Furthermore, the relearning unit 52 can discard the learned machine learning model and generate a learned machine learning model obtained by learning by using the excluded training data as the relearned learned model.

[Flow of Processing]

Figure 10:
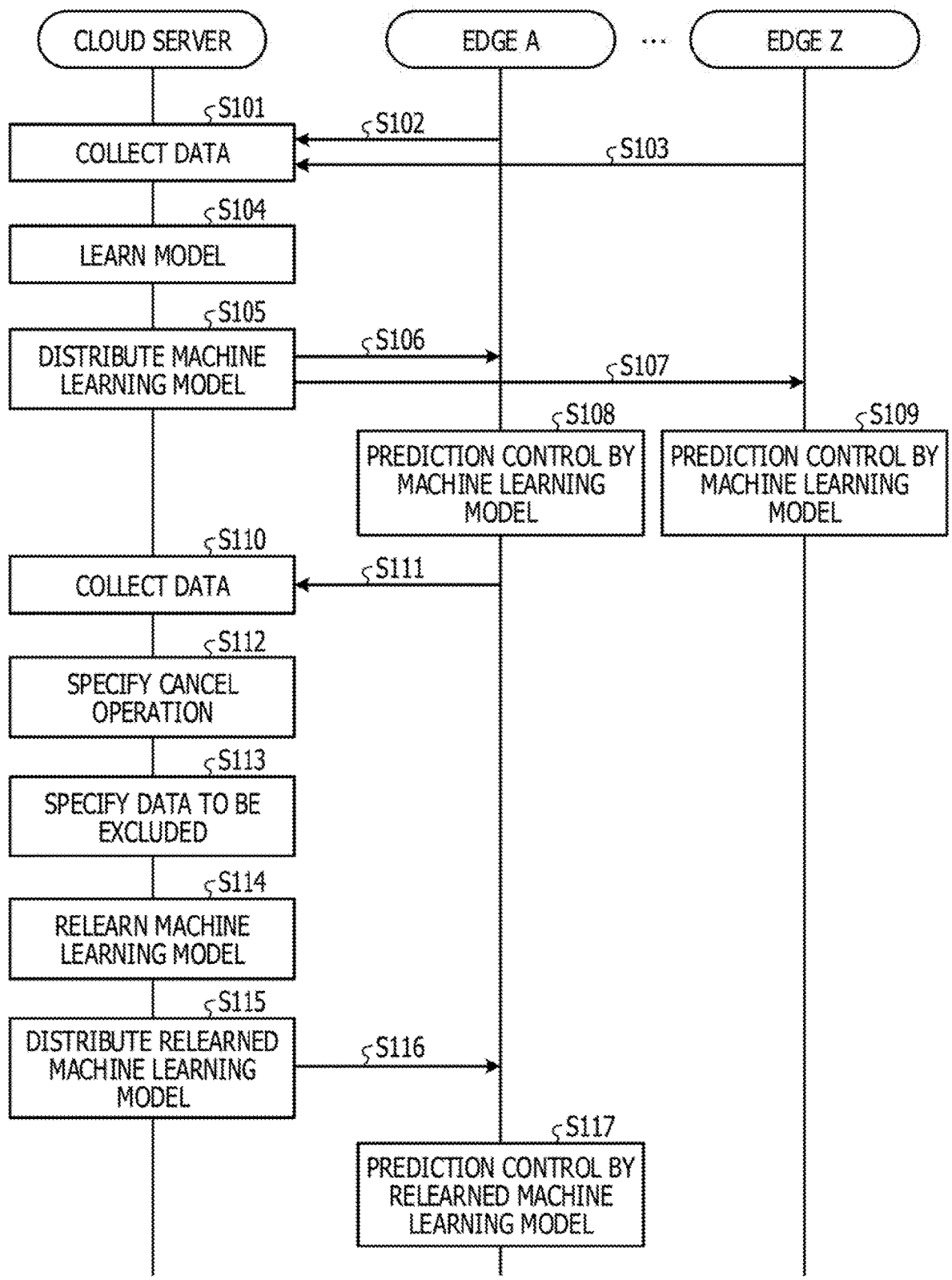
FIG. 10 is a sequence diagram illustrating a flow of processing.

Next, a series of flows from the distribution of the machine learning model to the relearning will be described. FIG. 10 is a sequence diagram illustrating a flow of processing. As illustrated in FIG. 10, the acquisition unit 30 of the cloud server 10 acquires data including the operation log and the sensor value from each edge (S101 to S103).

Subsequently, the learning processing unit 40 of the cloud server 10 generates training data from the acquired data and learns the machine learning model by using the training data (S104). Then, the learning processing unit 40 of the cloud server 10 distributes the learned machine learning model which is learned to each edge (S105 to S107).

Thereafter, each edge performs prediction control by using the learned machine learning model that is distributed (S108 and S109). For example, the edge terminal of each edge inputs a sensor value measured by a sensor to the learned machine learning model that is distributed and acquires a prediction result of a user's operation. Then, when the prediction result is "Up", each edge terminal increases a setting temperature of an air conditioner by one degree, and when the prediction result is "Down", each edge terminal lowers the setting temperature of the air conditioner by one degree. When the prediction result is "Keep", each edge terminal maintains the setting temperature of the air conditioner without changing the setting temperature.

Thereafter, the relearning processing unit 50 of the cloud server 10 collects data from an edge A (S110 and S111). For example, the relearning processing unit 50 receives data including the operation log and the sensor value collected by the edge A after the distribution of the machine learning model.

Subsequently, the relearning processing unit 50 of the cloud server 10 specifies a cancel operation on the basis of the collected data (S112) and excludes an operation log associated with the cancel operation from the training data of the data of the edge (S113).

Thereafter, the relearning processing unit 50 of the cloud server 10 relearns the machine learning model by using the training data obtained by excluding the data (S114) and distributes the relearned machine learning model only to the edge A (S115 and S116). Then, the edge terminal of the edge A performs prediction control by using the relearned machine learning model that is distributed (S117). In this way, relearning of the machine learning model is performed for each edge terminal.

[Effects]

As described above, after distributing the machine learning model to each edge, the cloud server 10 can specify data that is not suitable as the training data for each edge on the basis of the data acquired from each edge. Then, the cloud server 10 can relearn the machine learning model, for each edge, by using the training data obtained by excluding the data which is not suitable. Therefore, the cloud server 10 can exclude not only the data which is not suitable but also the data related to the data which is not suitable from the learning target. Therefore, the cloud server 10 can reduce a frequency of relearning and efficiently learn the machine learning model adapted to each edge.

Figure 11A:
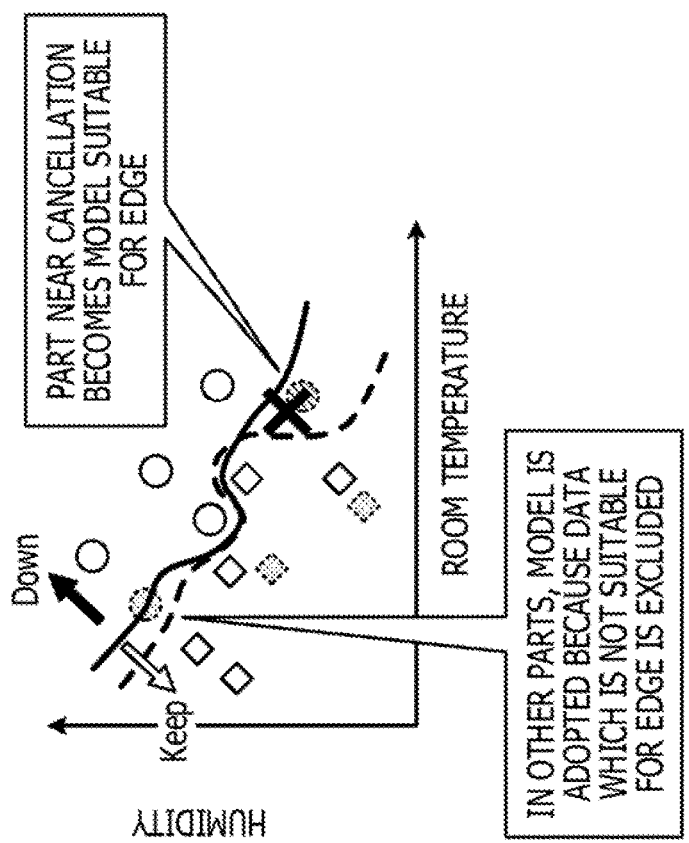
FIGS. 11A and 11B are diagrams for explaining a difference from general relearning.
Figure 11B:
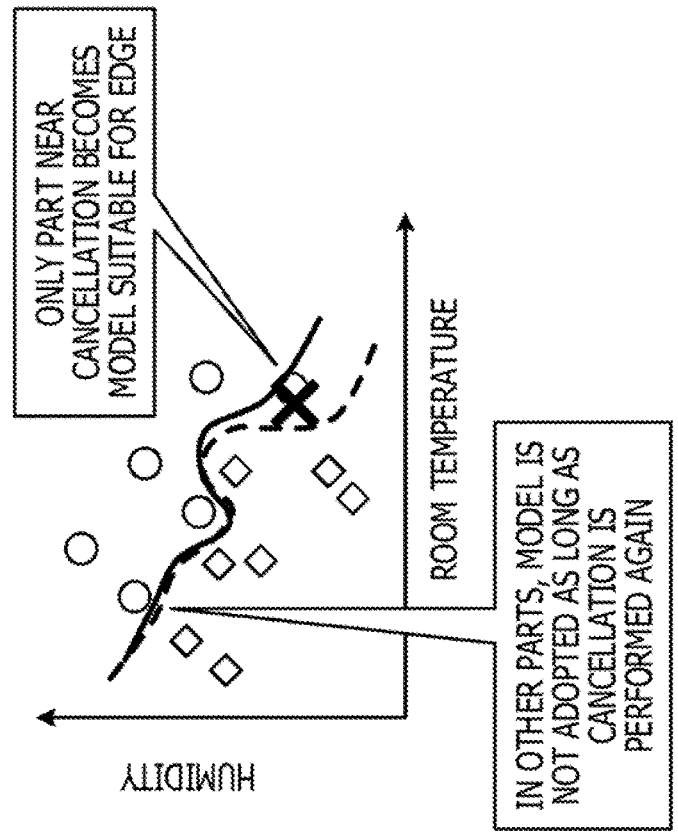

FIGS. 11A and 11B are diagrams for explaining a difference from general relearning. As illustrated in FIG. 11A, in the general relearning, relearning is performed as excluding only the data corresponding to the cancel operation when the cancel operation is performed. Therefore, a machine learning model of which a part near the cancel operation is adapted to an edge is generated. Therefore, in the relearned machine learning model, relearning is not performed until a new cancel operation is performed other than a part near the cancel operation. Therefore, with the general relearning, it is not possible to learn inappropriate underlying training data until the data becomes apparent. Furthermore, with the general relearning, relearning is repeatedly performed each time when the inappropriate underlying training data becomes apparent, and a frequency of relearning is high.

On the other hand, as illustrated in FIG. 11B, in relearning according to the first embodiment, when the cancel operation is performed, relearning is performed as excluding both of the data corresponding to the cancel operation and the data related to the data. Therefore, in the relearning according to the first embodiment, relearning can be performed as excluding not only data near the cancel operation but also the inappropriate training data in the machine learning model. Therefore, in the relearning according to the first embodiment, it is possible to relearn the entire machine learning model with respect to the single cancel operation in comparison with the general relearning. Accordingly, it is possible to reduce repetition of the relearning corresponding to the inappropriate underlying training data, and it is possible to quickly generate a machine teaming model adapted to the edge while reducing the frequency of the relearning.

Specific Example

Figure 12:
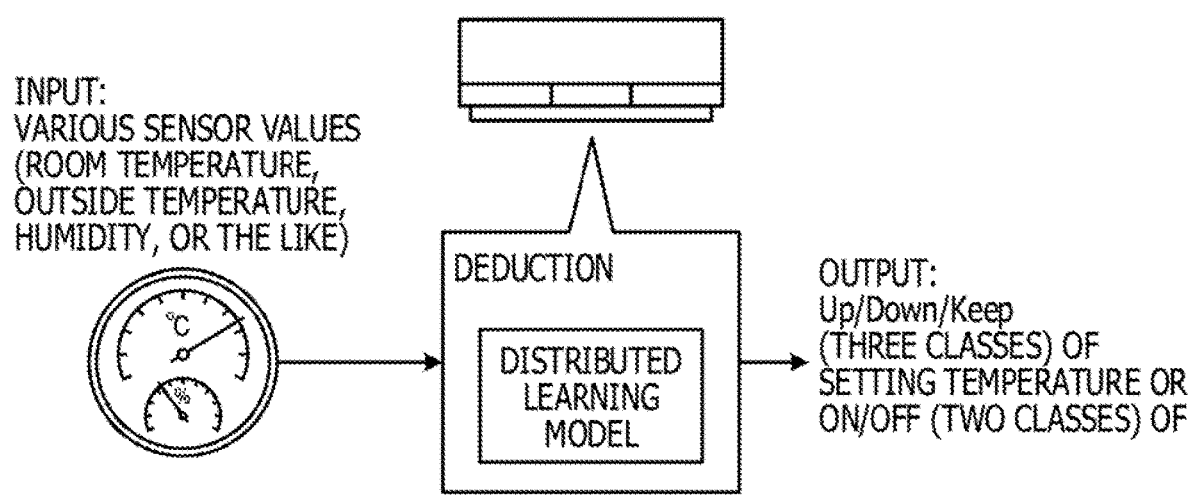
FIG. 12 is a diagram for explaining a first specific example to which the first embodiment is applied.

Next, application examples of the machine learning model according to the first embodiment will be described with reference to FIGS. 12 to 14. FIG. 12 is a diagram for explaining a first specific example to which the first embodiment is applied, FIG. 13 is a diagram for explaining a second specific example to which the first embodiment is applied, and FIG. 14 is a diagram for explaining a third specific example to which the first embodiment is applied.

As illustrated in FIG. 12, the machine learning model according to the first embodiment can be applied to a three-value classification model that inputs various sensor values such as the room temperature, the outside temperature, the humidity, or the like and predicts an operation on the setting temperature "Up/Down/Keep" or a binary value classification model that predicts a power operation "On/Of" on an air conditioner. In this case, as using the sensor value as an explanatory variable and using an operation on the setting temperature or a power operation on the air conditioner as an objective variable, a machine learning model is learned.

Figure 13:
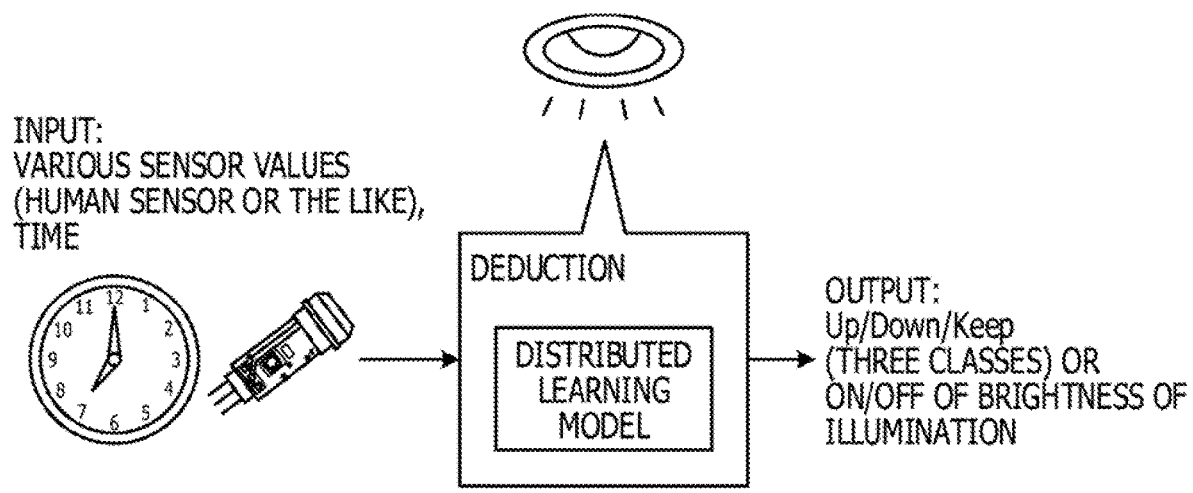
FIG. 13 is a diagram for explaining a second specific example to which the first embodiment is applied.

Furthermore, as illustrated in FIG. 13, the machine learning model according to the first embodiment can be applied to the three-value classification model which input the sensor value obtained by a human sensor or the like and predicts an illumination brightness operation "Up/Down/Keep". In this case, as using the sensor value as the explanatory variable and using the illumination brightness operation as the objective variable, the machine learning model is learned.

Figure 14:
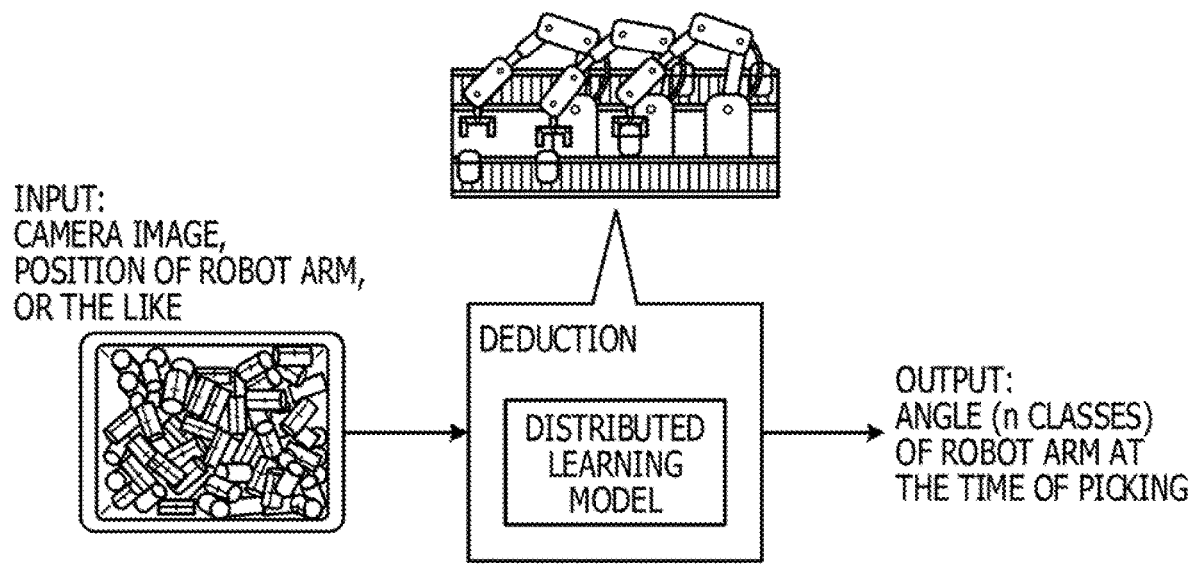
FIG. 14 is a diagram for explaining a third specific example to which the first embodiment is applied.

Furthermore, as illustrated in FIG. 14, the machine learning model according to the first embodiment can be applied to a model that inputs a camera image, position coordinates of a robot arm, or the like and predicts an angle of the robot arm at the time of picking. In this case, as using the camera image and the position coordinates of the robot arm as the explanatory variables and using the angle of the arm as the objective variable, a machine learning model is learned.

Second Embodiment

Although the embodiment has been described above, the present embodiment may be implemented in various forms in addition to the above embodiment.

[Exclusion Determination]

In the first embodiment, an example has been described in which the operation log associated with the cancel operation is specified and the data acquired from the edge that is a transmission source of the operation log is excluded from the learning target. However, the present embodiment is not limited to this. For example, it can be determined whether or not to exclude the data by integrally analyzing data of the edge to be relearned and data of the edge to be excluded.

Figure 15:
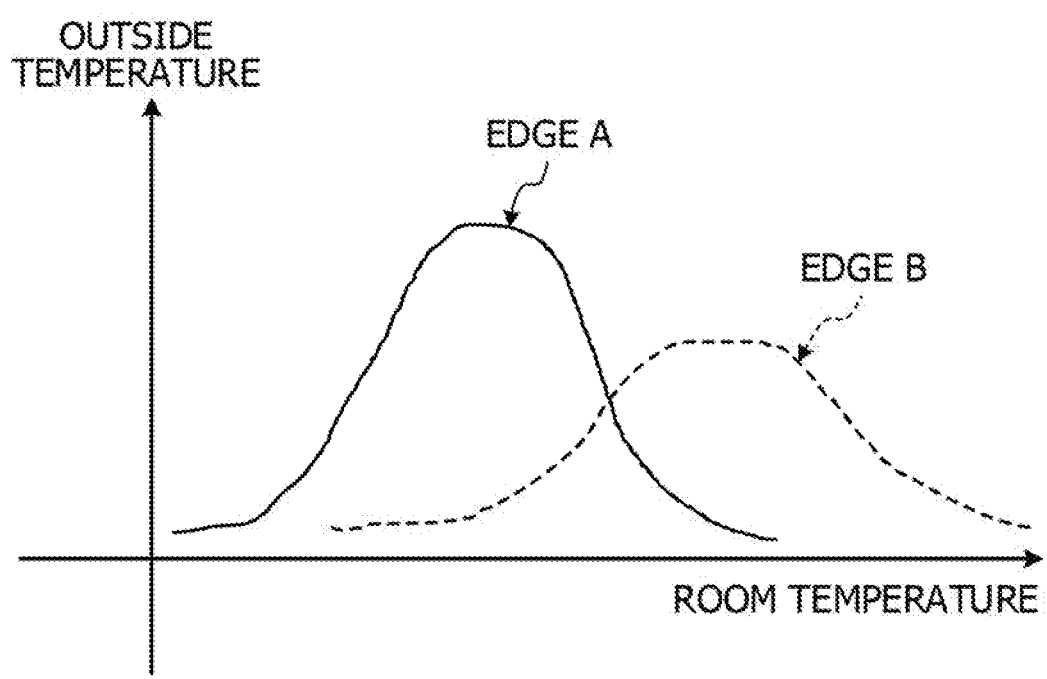
FIG. 15 is a diagram for explaining exclusion determination.

FIG. 15 is a diagram for explaining exclusion determination. As illustrated in FIG. 15, a cloud server 10 compares a data distribution of an edge A to be relearned and a data distribution of an edge B to be excluded and can determine the data distribution of the edge B as an exclusion target only when the data distributions are different from each other. Note that a case where the data distributions are different from each other is not limited to a case where all the data does not coincide and a case where a predetermined number of pieces of data does not coincide. A general criteria of statistics can be adopted. Furthermore, in FIG. 15, a relationship between a room temperature and an outside temperature is illustrated. However, the present embodiment is not limited to this, and various data measured by an edge such as the room temperature and the operation log can be adopted.

[Target Space]

In the above embodiments, the room in a company or the like has been described as an example. However, the present embodiment is not limited to this. For example, various spaces such as an inside of a train, a car, or the like, a machine room, and an airplane can be used as targets.

[Training Data]

In the above embodiments, an example has been described in which the room temperature, the outside temperature, and the humidity are used as the training data. However, the present embodiment is not limited to this. For example, a machine learning model that predicts a user's operation as using the room temperature and the outside temperature as training data, a machine learning model that predicts a user's operation as using a change in the room temperature and a change in the outside temperature within a predetermined period of time, for example, five minutes, as the training data, and the like can be learned. Furthermore, at the time of relearning, a log (operation log and sensor value) that is collected before relearning can be used as the training data. Furthermore, a device that generates a first machine learning model and a device that performs relearning can be separately made as different devices.

[Numerical Value]

The items of the sensor value, the numerical values, the number of devices, the number of edges, or the like described in the above embodiments are not limited to those illustrated, and information that can be collected by a general sensor and the like can be used. Furthermore, a prediction interval can be arbitrarily changed, for example, after 30 minutes or after two hours. In that case, a collection unit of the sensor value or the like is changed to an arbitrary time. Furthermore, an example has been described in which the sensor value and the operation log are used as the training data. However, the present embodiment is not limited to this, and only the sensor value can be used.

[Prediction]

In the above embodiments, an example has been described in which the machine learning model that predicts the user's operation is constructed. However, the present embodiment is not limited to this, and a machine teaming model that predicts a room temperature can be constructed. In this case, the room temperature at 30 minutes later, for example, is used as the objective variable.

[System]

Pieces of information including the processing procedure, control procedure, specific name, various types of data and parameters described above in the document or illustrated in the drawings may be changed in any ways unless otherwise specified.

Furthermore, each component of each apparatus illustrated in the drawings is functionally conceptual and does not necessarily have to be physically configured as illustrated in the drawings. For example, a specific form of distribution and integration of each apparatus is not restricted to the forms illustrated in the drawings. For example, this means that all or a part of the apparatus can be configured by being functionally or physically distributed and integrated in arbitrary units according to various loads, usage situations, or the like. For example, the learning processing unit 40 and the relearning processing unit 50 can be integrated.

Moreover, all or an arbitrary part of each processing function performed by each apparatus may be implemented by a central processing unit (CPU) and a program analyzed and executed by the CPU, or may be implemented as hardware by wired logic.

[Hardware]

Figure 16:
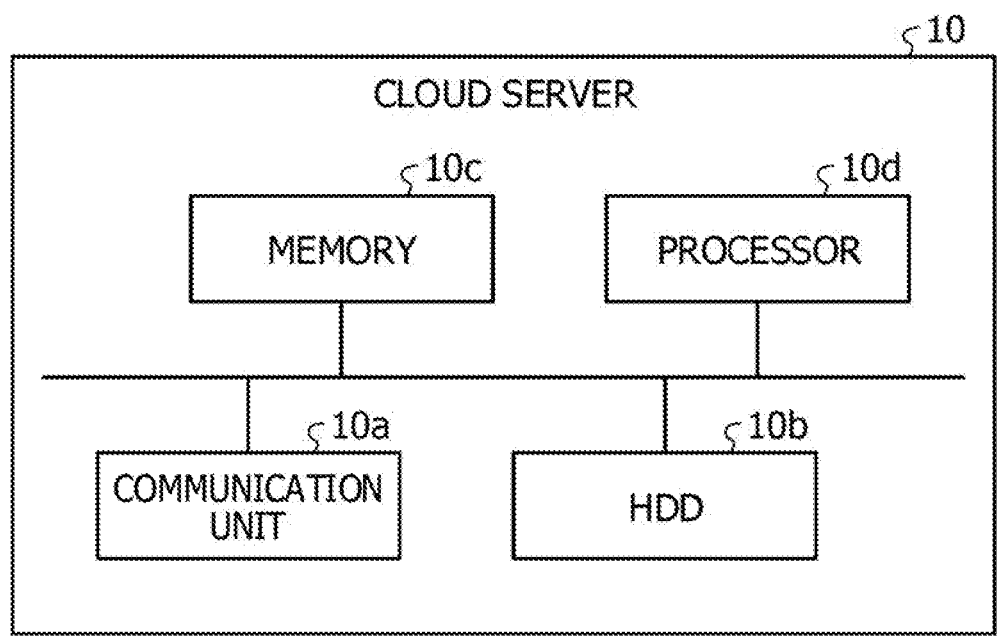
FIG. 16 is a diagram illustrating an example of a hardware configuration.

Since the hardware configuration of the cloud server 10 is included, here, a computer 300 will be described. FIG. 16 is a diagram illustrating an example of a hardware configuration. As illustrated in FIG. 16, the cloud server includes a communication device 10a, a Hard Disk Drive (HDD) 10b, a memory 10c, and a processor 10d. Furthermore, the units illustrated in FIG. 16 are connected to each other by a bus or the like.

The communication device 10a is a network interface card or the like and communicates with another server. The HDD 10b stores programs and DBs for activating the functions illustrated in FIG. 2.

The processor 10d reads a program that executes processing similar to that of each processing unit illustrated in FIG. 2 from the HDD 10b or the like to develop the read program in the memory 10c, thereby activating a process that executes each function described with reference to FIG. 2 and other drawings. For example, this process executes a function similar to that of each processing unit included in the cloud server 10. For example, the processor 10d reads a program having a function similar to those of the acquisition unit 30, the learning processing unit 40, the relearning processing unit 50, or the like from the HDD 10b or the like. Then, the processor 10d executes a process for executing the processing similar to those of the acquisition unit 30, the learning processing unit 40, the relearning processing unit 50, or the like.

In this manner, the cloud server 10 behaves as an information processing device that performs an air conditioning control method by reading and executing the program. Furthermore, the cloud server 10 can also implement functions similar to the functions of the above-described embodiments by reading the program described above from a recording medium by a medium reading device and executing the read program described above. Note that the program in the other embodiment is not limited to being executed by the cloud server 10. For example, the present embodiment can be similarly applied to a case where another computer or server executes the program, or a case where such computer and server cooperatively execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A machine learning method executed by a computer, the machine learning method comprising:
   distributing a first machine learning model learned on the basis of a plurality of first logs collected from a plurality of electronic devices to each of the plurality of electronic devices, the first machine learning model outputting operation content for operating an electronic device;
   when a cancel operation to cancel an output result of the first machine learning model is performed by a user relative to a first electronic device among the plurality of electronic devices, estimating a similar log corresponding to a state of the first machine learning model in which the cancel operation is performed from the plurality of first logs;
   generating a plurality of second logs by excluding a log of a second electronic device associated with the similar log from among the plurality of first logs;

generating a second machine learning model on the basis of the plurality of second logs; and distributing the second machine learning model to the first electronic device.

2. The machine learning method according to claim 1, wherein executing periodically acquiring a plurality of first logs from the plurality of electronic devices after the distribution of the first machine learning model, and the estimating includes: specifying a state of the first machine learning model in which the cancel operation is performed on the basis of the plurality of first logs acquired after the distribution of the first machine learning model; and estimating the similar log similar to the specified state from among the plurality of first logs used to learn the first machine learning model.

3. The machine learning method according to claim 1, wherein the distributing includes distributing the first machine learning model learned by using the plurality of first logs including operation content relative to the electronic device and a sensor value used to specify a state of the electronic device when the operation content is performed as training data; the estimating includes specifying a sensor value when the cancel operation is performed from among the sensor values included in the plurality of first logs after the distribution of the first machine learning model and specifies the second electronic device that has measured the specified sensor value; and the generating includes generating the second machine learning model on the basis of the training data obtained by excluding the log of the second electronic device from the training data.

4. The machine learning method according to claim 1, wherein the estimating includes: plotting the cancel operation on a space in which the sensor value included in the training data is used as a dimension, that is, a feature space associated with the operation content included in the training data; and specifying an electronic device that measures a sensor value associated with operation content in the training data dose to the plotted cancel operation as the second electronic device.

5. The machine learning method according to claim 1, wherein the first machine learning model and the second machine learning model are classification models that make classification into two or more classes on the basis of the plurality of first logs.

6. A non-transitory computer-readable storage medium storing a program that causes a computer to execute a process, the process comprising:

distributing a first machine learning model, which outputs operation content relative to an electronic device, learned on the basis of a plurality of first logs collected from a plurality of electronic devices to each of the plurality of electronic devices;

when a cancel operation to cancel an output result of the first machine learning model is performed by a user relative to a first electronic device among the plurality of electronic devices, estimating a similar log corresponding to a state of the first machine learning model in which the cancel operation is performed from the plurality of first logs;

generating a plurality of second logs by excluding a log of a second electronic device associated with the similar log from among the plurality of first logs;

generating a second machine learning model on the basis of the plurality of second logs; and distributing the second machine learning model to the first electronic device.

7. A machine learning device, comprising:

a memory; and a processor coupled to the memory and the processor configured to:

distribute a first machine learning model learned on the basis of a plurality of first logs collected from a plurality of electronic devices to each of the plurality of electronic devices, the first machine learning model outputting operation content for operating an electronic device, when a cancel operation to cancel an output result of the first machine learning model is performed by a user relative to a first electronic device among the plurality of electronic devices, estimate a similar log corresponding to a state of the first machine learning model in which the cancel operation is performed from the plurality of first logs, generate a plurality of second logs by excluding a log of a second electronic device associated with the similar log from among the plurality of first logs, generate a second machine learning model on the basis of the plurality of second logs; and distribute the second machine learning model to the first electronic device.

8. The machine learning device according to claim 7, wherein the processor is configured to: execute periodically acquiring a plurality of first logs from the plurality of electronic devices after the distribution of the first machine learning model, and specify a state of the first machine learning model in which the cancel operation is performed on the basis of the plurality of first logs acquired after the distribution of the first machine learning model, and estimate the similar log similar to the specified state from among the plurality of first logs used to learn the first machine learning model.

9. The machine learning device according to claim 7, wherein the processor is configured to: distribute the first machine learning model learned by using the plurality of first logs including operation content relative to the electronic device and a sensor value used to specify a state of the electronic device when the operation content is performed as training data, specify a sensor value when the cancel operation is performed from among the sensor values included in the plurality of first logs after the distribution of the first machine learning model and specifies the second electronic device that has measured the specified sensor value, and generate the second machine learning model on the basis of the training data obtained by excluding the log of the second electronic device from the training data.

10. The machine learning device according to claim 7, wherein the processor is configured to: plot the cancel operation on a space in which the sensor value included in the training data is used as a dimension, that is, a feature space associated with the operation content included in the training data, and specify an electronic device that measures a sensor value associated with operation content in the training data close to the plotted cancel operation as the second electronic device.

11. The machine learning device according to claim 7, wherein the first machine learning model and the second machine learning model are classification models that make classification into two or more classes on the basis of the plurality of first logs.

* * * * *